(12) United States Patent
Ward et al.

(10) Patent No.: US 11,838,283 B2
(45) Date of Patent: *Dec. 5, 2023

(54) NETWORK ENCLAVE ATTESTATION FOR NETWORK AND COMPUTE DEVICES

(71) Applicant: Cisco Technology, Inc., San Jose, CA (US)

(72) Inventors: David Delano Ward, Somerset, WI (US); Robert Stephen Rodgers, Mountain View, CA (US); Andrew Phillips Thurber, Charlotte, VT (US); Eric Voit, Bethesda, MD (US); Thomas John Giuli, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,935

(22) Filed: Oct. 4, 2022

(65) Prior Publication Data

US 2023/0026420 A1 Jan. 26, 2023

Related U.S. Application Data

(63) Continuation of application No. 16/808,966, filed on Mar. 4, 2020, now Pat. No. 11,489,823.

(51) Int. Cl.
*H04L 9/40* (2022.01)
(52) U.S. Cl.
CPC ............ *H04L 63/08* (2013.01); *H04L 63/126* (2013.01)

(58) Field of Classification Search
CPC ....... G06F 21/57; G06F 21/53; H04L 63/126; H04L 63/08
USPC ............................................................ 726/4
See application file for complete search history.

(56) References Cited

U.S. PATENT DOCUMENTS

| | | | |
|---|---|---|---|
| 2014/0304765 A1* | 10/2014 | Nakamoto | H04L 63/20 726/1 |
| 2019/0197260 A1 | 6/2019 | Wang et al. | |
| 2020/0134171 A1 | 4/2020 | Li et al. | |
| 2021/0281577 A1* | 9/2021 | Sasaki | H04L 63/0435 |

* cited by examiner

*Primary Examiner* — Benjamin A Kaplan
(74) *Attorney, Agent, or Firm* — Polsinelli

(57) ABSTRACT

An enclave manager of a network enclave obtains a request to retrieve configuration information and state information corresponding to compute devices and network devices comprising a network enclave. The request specifies a set of parameters of the configuration information and the state information usable to generate a response to the request. The enclave manager evaluates the compute devices, the network devices, and network connections among these devices within the network enclave to obtain the configuration information and the state information. Based on the configuration information and the state information, the enclave manager determines whether the network enclave is trustworthy. Based on the parameters of the request, the enclave manager generates a response indicating a summary that is used to identify the trustworthiness of the network enclave.

20 Claims, 11 Drawing Sheets

NETWORK ENCLAVE ATTESTATION FOR NETWORK AND COMPUTE DEVICES

CROSS-REFERENCE TO RELATED APPLICATIONS

This application is a continuation of U.S. application Ser. No. 16/808,966, filed on Mar. 4, 2020, entitled "NETWORK ENCLAVE ATTESTATION FOR NETWORK AND COMPUTE DEVICES," which is expressly incorporated by reference herein in its entirety.

TECHNICAL FIELD

The present disclosure generally relates to the field of computer networking, particularly with regard to the evaluation and generation of attestation information within a network enclave to assess the reliability and trustworthiness of networking and computing devices operating within the network enclave.

BACKGROUND

In computer networking, network administrators are often concerned with the security of network and compute devices implemented within a networking environment, such as a network enclave. These devices can be subject to physical tampering at the time of manufacture, in transit, or in any uncontrolled environment, and via software tampering within a network. In various instances, compute devices serve as endpoints within a networking environment, whereby each compute device can have a set of interfaces and a set of network access points. This can make it easier to protect and inspect these devices. However, the protection and inspection of network devices can be more difficult, as these devices often have a very broad scope due to their intrinsic roles within the networking environment. This makes it important to ensure that the network and compute devices within a networking environment are verifiable at all times and on an ongoing basis.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
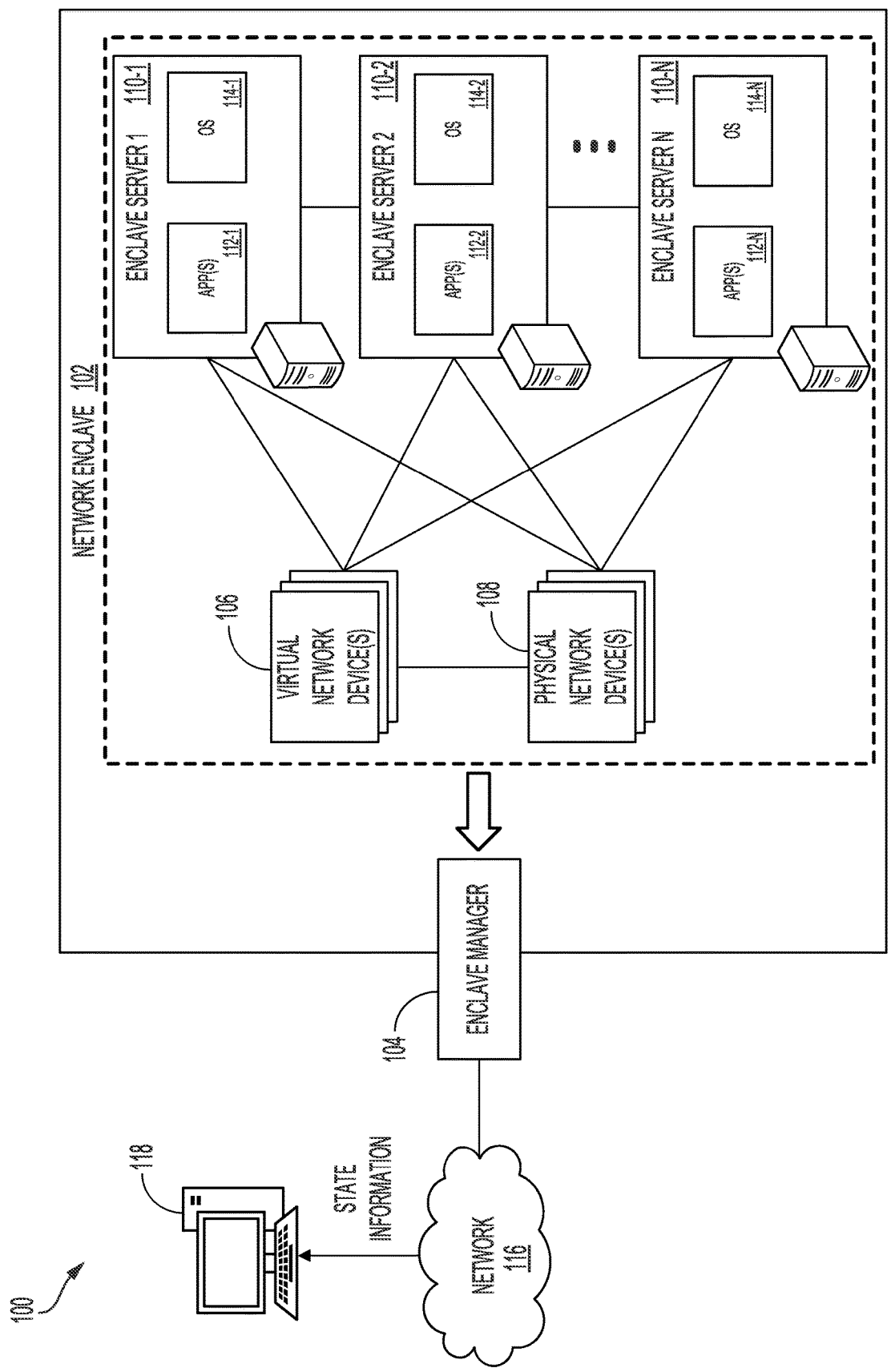
FIG. 1 shows an illustrative example of a networking environment in which an enclave manager within a network enclave generates and provides an attestation summary for a set of components operating within an enclave domain in accordance with various implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for assessing the reliability and trustworthiness of devices operating within a network environment with route reflectors.

In an example, a computer-implemented method performed by an enclave manager of a network enclave comprises obtaining a request to retrieve configuration information and state information corresponding to compute devices and network devices comprising a network enclave. The request specifies a set of parameters of the configuration information and of the state information usable to generate a response to the request. The computer-implemented method further comprises evaluating the compute devices, the network devices, and network connections among these devices within the network enclave to obtain the configuration information and the state information; determining, based on the configuration information and the state information, whether the compute devices and the network devices are trustworthy, resulting in a determination; generating, based on the set of parameters, the response to the request, where the response comprises at least the determination; and providing the response to fulfill the request.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

DESCRIPTION OF EXAMPLE EMBODIMENTS

Figure 10:
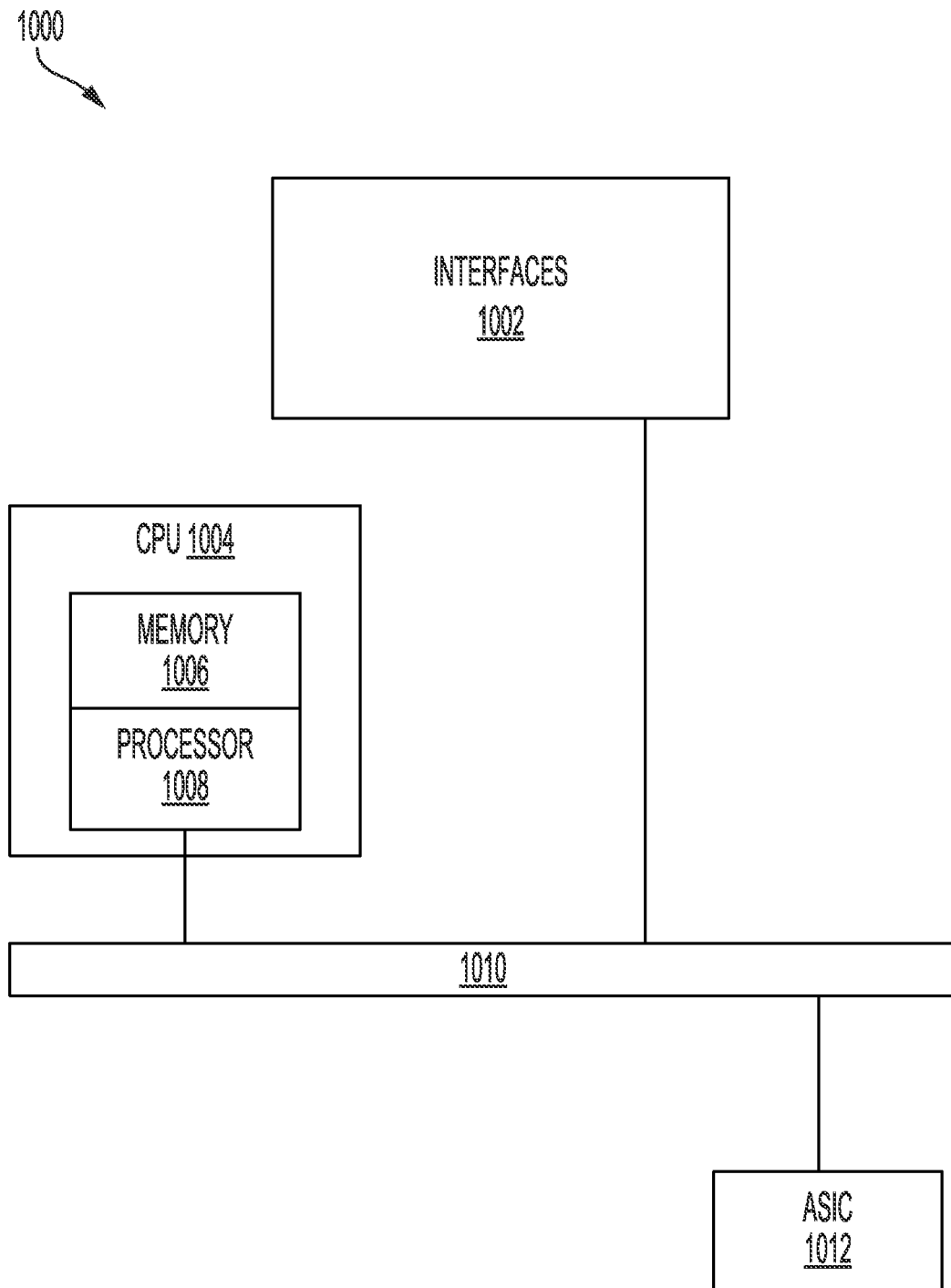
FIG. 10 illustrates an example network device suitable for performing switching, routing, and other networking operations in accordance with some implementations.
Figure 11:
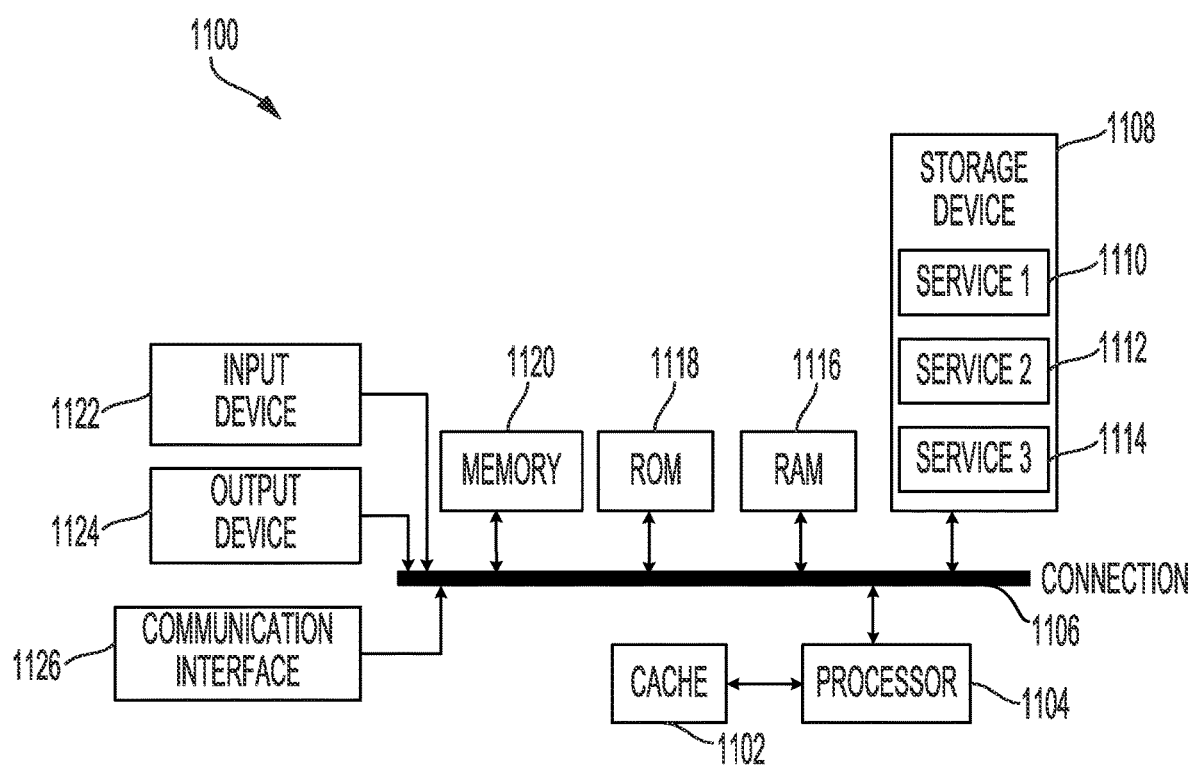
FIG. 11 illustrates a computing system architecture including various components in electrical communication with each other using a connection in accordance with some implementations.

Disclosed herein are systems, methods and computer-readable storage media for providing real-time remote attestation for network enclaves across enclave servers, physical and virtual network devices, and applications operating within the enclave domain. The present technologies will be described in more detail in the following disclosure as follows. The discussion begins with a detailed description of example systems, processes and environments for obtaining and providing attestation information for various network and compute components within a particular network enclave, as illustrated in FIGS. 1 through 9, will then follow. The discussion concludes with a description of an example network and computing devices, as illustrated in FIGS. 10 and 11.

The disclosure now turns to an initial discussion of example concepts and technologies for providing verifiable proof of integrity of compute and network devices, as well as of network connections among these devices, within a network enclave.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a validation token associated with the device. A validation token can indicate or otherwise include a signed measurement associated with a device for verifying trustworthiness of the device. In turn, such measurements can be referred to as validation tokens because each signed measurement is like a token proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through validation tokens, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a validation token/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. validation tokens, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee or attester with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee or attester TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. validation tokens, and/or tokens can mean that a receiver should have the option of verifying the information. In many cases, such verification can be performed without the need of supplementary evidence being sent with the validation token. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity token and a running process binary signature token based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. validation tokens, and/or verifications for integrity can be implemented, such as a measured-boot token (e.g., SHA1 hash over PCRs 0-7), a verified-boot token (e.g., which can verify that only recognized binaries were executed when booting), a process-token (e.g., root-of-trust validated through a process which is asserting a particular protocol or protocols), a file-system token (e.g., all files within a vendor determined set of directories), a log-integrity token (e.g., used to augment existing integrity analytics and forensics), a configuration token (e.g., State of the current device configuration), etc. Some implementations can achieve all or some of these tokens, depending on the implementation. Moreover, in some implementations, all or some of these tokens can be implemented or achieved using a single or multiple tokens.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an in-Situ (or in-band) Operations, Administration and Management (iOAM) data field.

In some implementations, the metadata elements and tokens can be carried with iOAM trace data. For example, a validation token can be carried as part of an iOAM data field in a variety of encapsulation protocols such as, for example and without limitation, IPv4, IPv6, NSH (Network Service Header), etc. In some cases, the validation token can be carried in an iOAM data field as an iOAM Trace option data element (e.g., with an iOAM Trace type for node integrity validation token). A metadata element, token, or digest, e.g. validation token digest, can be added in the iOAM trace option of a packet by each node that forwards the packet.

When the packet reaches a node (e.g., the destination node and/or an intermediate node) that removes iOAM metadata (e.g., an iOAM decapsulating node), the validity of the metadata element and/or token in the packet can be verified to determine that the packet traversed uncompromised nodes. In some examples, since validation tokens are time bound, the packet trace timestamps defined in iOAM can be used to validate the validation token in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an iOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry iOAM POT data with space optimization of metadata element values, e.g. validation token values. For example, a new iOAM POT data field can carry a validation token or a hash extend of a validation token and, in turn, validation token data can be carried across nodes. In some cases, a validation token hash extend can be a similar method as PCR extend operation performed by TPMs.

In some cases, the validation token hash can provide a one-way hash so that a validation token recorded by any node cannot be removed or modified without detection. iOAM proof of transit option data for a validation token digest can be defined by a hash algorithm (e.g., 20 octets with SHA1, 32 octets with SHA 256, etc.). In some implementations, each node along a path of the packet can forward the packet with a new or updated validation token digest. In some examples, the new or updated validation token digest can be generated by a node as follows: iOAM validation token digest new value=Digest of (iOAM validation token digest old value|| hash (validation token of the node)), where the iOAM validation token digest old value can refer to the validation token digest included in the packet by one or more previous hops.

Moreover, in some cases, a Per Packet Nonce (PPN), where PPN changes per packet and is carried as another field within the iOAM metadata option, can be added to provide robustness against replay attacks. To illustrate, in some examples, a PPN can be added as follows: iOAM validation token digest new value=Digest of (iOAM validation token digest old value|| hash (validation token of the node||PPN)). A node creating the new value for the iOAM validation token digest can thus take the value of any previous iOAM validation token digest and extend/hash that value with the node's current validation token. The result of the concatenation and hashing can then be written into iOAM POT data (or other iOAM data fields) as the new iOAM validation token digest.

At the verifier (e.g., the device verifying the validation token data), the same operation can be performed over expected validation token values calculated for the nodes that are traversed in the time window when the packet was forwarded. A verifier can be an inline device or a centralized device. Moreover, in some examples, nodes that are expected to be traversed can be identified using iOAM tracing, routing state or by sending active probes. A match between the value of POT data carrying specific metadata elements, e.g. a validation token digest and the expected validation token value, can prove that the packet traversed through trusted or uncompromised nodes.

In some examples, one or more strategies can be implemented to optimize metadata element validation. For example, metadata elements, e.g. validation tokens, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first token received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a validation token digest value can be: iOAM validation token digest new value=Digest of (iOAM validation token digest old value|| hash (validation token of the node|| TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attester, e.g. a node or a verifier, can use random numbers, otherwise pseudo-random numbers, created by peers and/or the attester to generate and verify attestation information. Specifically, the attester can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attester, can use the result created by the cryptoprocessor, to verify/validate that their corresponding provided random number was used in generating the nonce ultimately used by the cryptoprocessor to create the result. In turn, the layer 2 peers, potentially including the attester, can generate verified attestation information based on the random numbers generated by the peers, the nonce created from the random numbers, and/or the result created by the cryptoprocessor from the nonce.

Having provided an initial discussion of example concepts and technologies for providing explicit verifiable proof of integrity of network nodes traversed by packets, the disclosure now turns to FIG. 1.

FIG. 1 shows an illustrative example of a networking environment 100 in which an enclave manager 104 within a network enclave 102 generates and provides an attestation summary for a set of components operating within an enclave domain in accordance with various implementations. A network enclave, such as network enclave 102, is a distinct logical entity that encompasses various constructs including application and/or customer-specific resources to deliver a trusted platform that meets one or more service-level agreements (SLAs). Security within the network enclave 102 can be enforced to a known or measurable level through various methods. The components that form the network enclave 102 can vary in form factor and be physical and/or virtual, and the requirements for functions may be based on business or application needs. For instance, as illustrated in FIG. 1, the network enclave 102 may include a set of enclave servers (e.g., enclave server 1 110-1, enclave server 2 110-2, and enclave server N 110-N), each comprising one or more applications (e.g., applications 112-1, applications 112-2, and applications 112-N) and an operating system (e.g., operating system 114-1, operating system 114-2, and operating system 114-N). These servers may be physical servers comprising hardware (e.g., processors, memory, etc.) and software (e.g., applications, etc.) that may be used to provide a set of services to users of the network enclave 102.

The network enclave 102 may further include one or more physical network devices 108, such as routers, switches, gateways, modems, repeaters, access points, and the like. These one or more physical network devices 108 may provide network connectivity among the various enclave servers within the network enclave 102 and route incoming network traffic from an ingress point of the network enclave 102 to the enclave servers, which may serve as endpoints of the network enclave 102. In addition to physical network devices 108, the network enclave 102 may further include virtual network devices 106, which may provide virtual networking capabilities for a virtual private network (VPN), Easy Virtual Network (EVN), or other virtualized network. These virtual network devices 106 may be logically implemented on one or more physical devices, such as physical network devices 108 and/or enclave servers 110. For instance, a virtual network device 106 may include a logical switch generated using one or more physical switches or other physical network devices 108.

It should be noted that the network enclave 102 may include other components in addition to those described above and illustrated in FIG. 1. For instance, the network enclave 102 may include a set of smart Network Interface Cards (NICs), programmable field-programmable gate arrays (FPGAs), graphics processing units (GPUs), and any applicable security/encryption hardware and software.

In an embodiment, components of the network enclave 102 can form an adjacency to exchange routing protocol packets or other data packets within the network enclave 102. While these components may form this adjacency amongst themselves, there may be intermediate devices connecting adjacent components within the network enclave 102. For example, rather than a physical cable separating adjacent components, one or more intermediate devices may provide connectivity between these components. To obviate the need to have these intermediate devices identified and attested, these adjacent components may establish a Media Access Control Security (MACsec) session between them. This MACsec session may prevent security threats, such as passive wiretapping, intrusion, man-in-the-middle (MitM) attacks, playback attacks, and the like. Further, the MACsec session may prevent any of these intermediate devices from snooping or altering the network traffic between adjacent components of the network enclave 102. Network traffic transmitted over a MACsec session is encrypted and decrypted using a cipher suite agreed upon by the adjacent components. It should be noted that while MACsec is used throughout the present disclosure for the purpose of illustration, other cryptographic communication standards may be used (e.g., IPsec, etc.).

In an embodiment, the network enclave 102 further includes an enclave manager 104, which may obtain, from the various components of the network enclave 102, attestation information (e.g., validation tokens, integrity data, etc.) that may be used to determine the trustworthiness of each of the components of the network enclave 102. Further, the enclave manager 104 may obtain data from other sources that may be used to validate each of the components of the network enclave 102. For example, in an embodiment, the enclave manager 104 obtains Product Security Incident Response Team (PSIRT) information or bulletins detailing known vulnerabilities relevant to the various components of the network enclave 102. For instance, the enclave manager 104 may be subscribed to a PSIRT service to obtain PSIRT information or bulletins when they are generated. Alternatively, the enclave manager 104 may periodically transmit requests to the PSIRT service to obtain this information.

In an embodiment, the enclave manager 104 obtains, over a communications network 116 (e.g., Internet, etc.), a request from an operator 118 of the network enclave 102 to obtain proof that the network enclave 102 is secure and trustworthy. The operator 118 may include an administrator, network operator, or other user of the network enclave 102. The request may be submitted in the form of an application programming interface (API) call to the enclave manager 104. Through this API call, the operator 118 may indicate what data or status information for the set of devices and other components of the network enclave 102 are required for validation of the set of devices and other components by the operator 118. For instance, rather than requesting all validation data (e.g., validation tokens, PSIRT information and bulletins, configuration information and key performance indicators (KPIs), etc.), the operator 118 may request a summary of this validation data that indicates whether the components of the network enclave 102 are verifiably trustworthy.

In response to the obtaining the API call from the operator 118, the enclave manager 104 may compile the validation data from the various components of the network enclave 102 to generate the requested summary. For instance, the enclave manager 104 may obtain the integrity data and validation tokens for the various components of the network enclave 102 and compare these against known good values (KGVs) for the various components of the network enclave 102. Further, the enclave manager 104 may generate, based on an analysis of the provided integrity data, a table or other data structure summarizing the integrity verification state of the components of the network enclave 102. In an embodiment, the response from the enclave manager 104 may further include boot-to-application level attestation (e.g., validation tokens, integrity data, etc.) of the enclave manager 104, which the operator 118 may evaluate to determine whether the provided response can be trusted.

In addition to evaluating the validation tokens and integrity data of these components of the network enclave 102, the enclave manager 104 may obtain the aforementioned PSIRT information and bulletins in order to determine whether any components of the network enclave 102 are configured with a known vulnerable feature. If the enclave manager 104 determines that no components of the network enclave 102 are configured with any known vulnerable feature, the enclave manager 104, in its response to the API call, may indicate that the known vulnerable feature cannot be exploited within the network enclave 102.

In an embodiment, the API call may indicate that iOAM path tracing is to be implemented on the various components of the network enclave 102. This may cause each component of the network enclave 102 that may route data packets through the network enclave 102 to insert, into the data packet, iOAM POT data that may be validated by the enclave manager 104. The enclave manager 104 may, thus, evaluate network traffic through the various components of the network enclave 102 to identify the iOAM POT data and determine, based on this data, whether network traffic traversing through the network enclave 102 along valid network paths. The results of these evaluations may be provided in the response to the API call or at any other time as the enclave manager 104 monitors network traffic.

In an embodiment, the API call may indicate that an audit of the components of the network enclave 102 is to be performed in order to determine whether configuration drift among one or more components of the network enclave 102 can be detected. In response to the API call, the enclave manager 104 may identify the configured state of the components of the network enclave 102. For instance, the enclave manager 104 may query these components to obtain the configuration information for each of these components. Alternatively, the components may provide the configuration information themselves over time to the enclave manager 104, which may retain this configuration information in a repository or database. The enclave manager 104 may compare this configuration information to known valid configuration information maintained on a management platform of the network enclave 102 or by the enclave manager 104 itself. The results of this comparison may be provided to the operator 118 in the summary generated by the enclave manager 104.

In an embodiment, the enclave manager 104 performs KPI monitoring of the components of the network enclave 102 to identify any anomalies that may otherwise not be detectable through evaluation of the integrity data or validation tokens of these components. These anomalies may include unusual power draws, significant variations in network traffic, significant variations in load, or any other unusual or unexpected behavior within the network enclave. Performance metrics for these components may be compared to the KPIs for each of these components to identify any of these anomalies. The results of these compliance checks may be summarized in the response to the operator 118.

It should be noted that the trustworthiness evaluations described above may be performed asynchronously or otherwise absent any request from operators to obtain verification of the trustworthiness of the network enclave 102. For instance, the enclave manager 104 may perform the various evaluations described above to determine the trustworthiness of the various components of the network enclave 102 and of the network enclave 102 as a whole periodically or in response to a triggering event (e.g., detection of a security issue, receipt of a security bulletin or other information indicating a possible security threat to the network, etc.).

Figure 2:
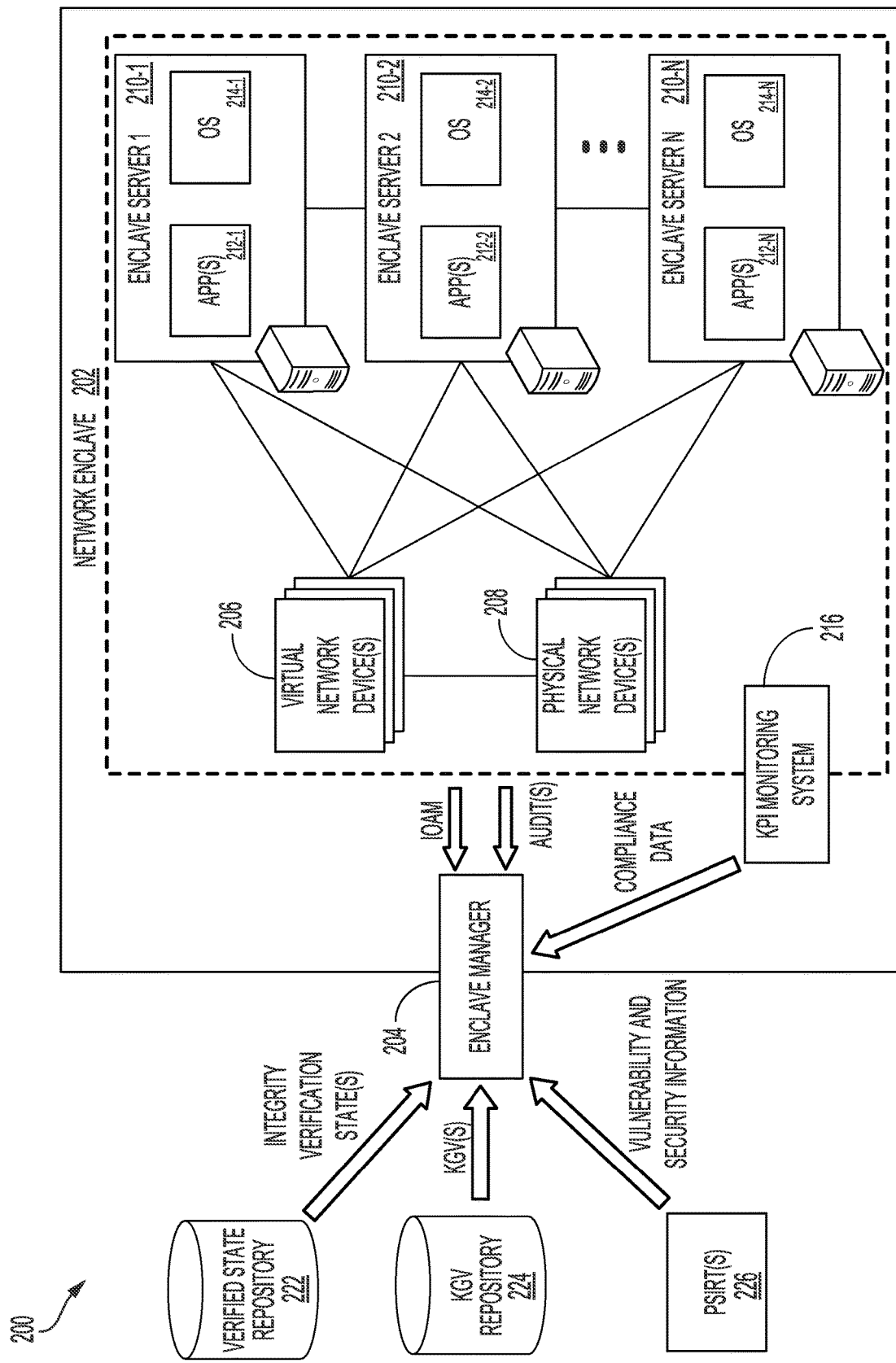
FIG. 2 shows an illustrative example of a networking environment in which an enclave manager generates attestation information for a set of components operating within an enclave domain in accordance with various implementations.

FIG. 2 shows an illustrative example of a networking environment 200 in which an enclave manager 204 generates attestation information for a set of components operating within an enclave domain in accordance with various implementations. The network enclave 202 may be similar to the network enclave 102 described above in connection with FIG. 1. For instance, the network enclave 202 may include a set of virtual network devices 206, a set of physical network devices 208, and a set of enclave servers 210, each comprising applications 212 and an operating system 214. The network enclave 202 may further include an enclave manager 204, which may process incoming API calls to obtain attestation information or other state information that may be used to determine the trustworthiness of the network enclave 202 through evaluation of the trustworthiness of one or more components of the network enclave 202 and the network connections therein.

As noted above, the enclave manager 204 may perform real-time attestation across the set of components of the network enclave 202 and the various applications 212 executing within the enclave domain. For instance, the enclave manager 204 may obtain, from each component of the network enclave 202, a validation token and/or integrity data that may be used to determine the trustworthiness of the component. The enclave manager 204 may obtain, from a verified state repository 222, integrity verification state information that may be used to evaluate the obtained validation tokens and/or integrity data to determine whether each component of the network enclave 202 is trustworthy. In addition to the integrity verification state information, the enclave manager 204 may obtain, from a KGV repository 224, KGVs for the components of the enclave domain. These KGVs may be used to determine whether the components of the network enclave 202 are executing specific software versions for specific device types. Thus, using the integrity verification state information and the KGVs, the enclave manager 204 may generate proof of the trustworthiness of the components of the network enclave 202. In an embodiment, if an operator submits a request (e.g., API call) to determine whether the network enclave 202 is trustworthy or is otherwise in an acceptable state, the enclave manager 204 may provide a table summarizing the integrity verification state of the components of the network enclave 202, as well as the proof that the components of the network enclave 202 are executing these specific software versions. It should be noted that while KGVs are used throughout the present disclosure for the purpose of illustration, other information may be used to perform real-time attestation across the set of components of the network enclave 202 and the various applications 212 executing within the enclave domain. For instance, operating system information may be used as part of the real-time attestation.

In an embodiment, the enclave manager 204 can obtain, from a PSIRT service 226, PSIRT information or bulletins specifying vulnerability and security information that may be used to identify vulnerabilities in the configuration of each component operating within the network enclave 202. The enclave manager 204 may evaluate the configuration of each of the components of the network enclave 202 to determine whether any vulnerabilities identified in the PSIRT information can be exposed or are otherwise part of the configuration of a component. Based on this evaluation, the enclave manager 204 may generate proof that a vulnerable feature highlighted in the PSIRT information has not been configured onto any component of the network enclave 202 and, thus, cannot be exploited within the enclave domain.

In an embodiment, the request from the operator or peer of the network enclave 202 may indicate that iOAM path tracing is to be implemented to determine whether data packets traversing the network enclave 202 are transmitted within the network enclave 202 using network paths transiting devices which are verified to meet a set of security metrics or avoid other devices with unaddressed PSIRT information. In response to the request, the enclave manager 204 may configure the virtual network devices 206 and physical network devices 208 to insert proof of transit information into an iOAM data field of each data packet traversing through the network enclave 202. The enclave manager 204 may evaluate the proof of transit information inserted into the data packet via the iOAM data field to determine whether data packets are being transited via valid network paths. The enclave manager 204 may provide a response to the request that indicates the results of this evaluation.

In an embodiment, the enclave manager 204 can additionally, or alternatively, generate an audit trail showing that the configured state of the components of the network enclave 202 as reported by the components themselves over time. In some instances, the enclave manager 204 may obtain configuration information from each component of the network enclave 202 and compare this configuration information to known valid configuration information maintained by the enclave manager 204 to identify any configuration drift among the components of the network enclave 202. The enclave manager 204 may indicate, in its response to a request from an operator/peer to obtain state information with regard to the network enclave 202, a summary of this audit that specifies whether any configuration drift has been identified for one or more components of the network enclave 202.

The enclave manager 204 may additionally, or alternatively, engage a KPI monitoring system 216 of the network enclave 202 to perform system wide compliance checks on the various components of the network enclave 202. For instance, if the enclave manager 204 detects an anomaly among one or more components of the network enclave 202, the enclave manager 204 may transmit a request to the KPI monitoring system 216 to perform these compliance checks by comparing performance metrics of the one or more components of the network enclave 202 against known valid KPIs for these one or more components. The KPI monitoring system 216 may provide, to the enclave manager 204, the results of these compliance checks in the form of compliance data. The enclave manager 204 may generate, using the compliance data, a summary highlighting any components that have failed a compliance check. If all components pass the compliance checks performed by the KPI monitoring system 216, the enclave manager 204 may indicate that the components conform to the known valid KPIs.

Figure 3:
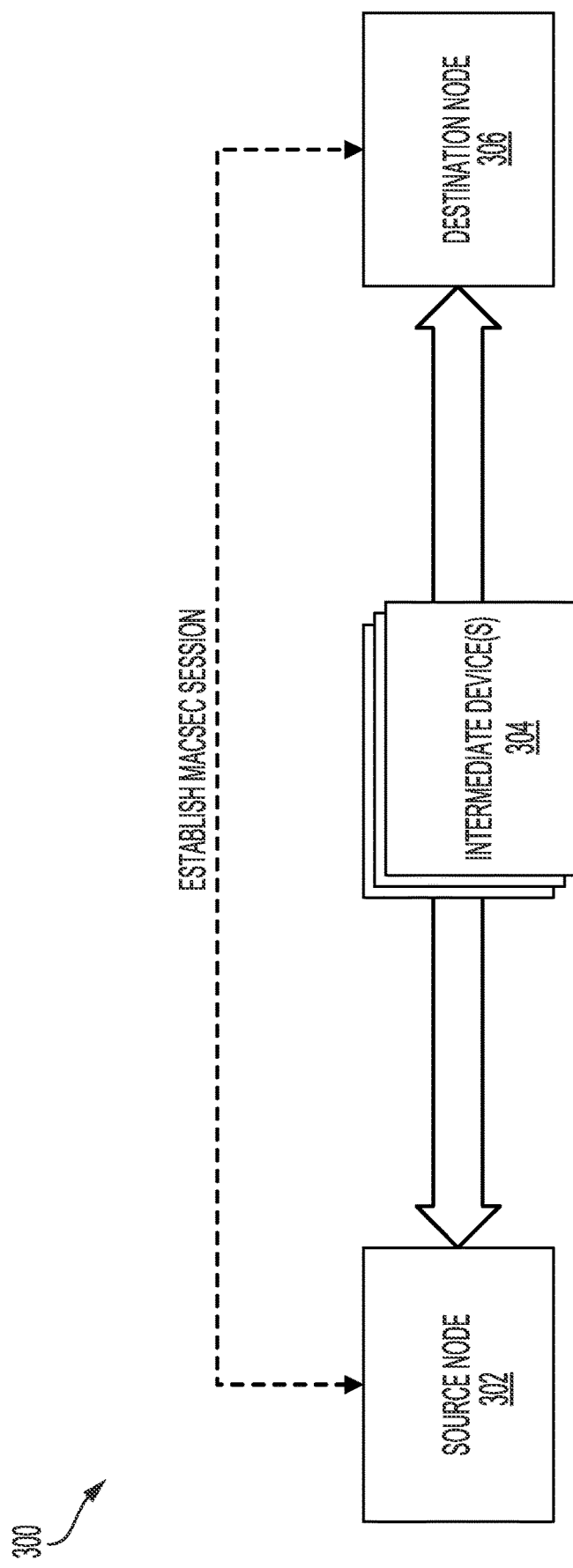
FIG. 3 shows an illustrative example of a networking environment in which a Media Access Control Security (MACsec) session is established between a set of nodes verifiably connected to one another within a network enclave in accordance with various implementations.

FIG. 3 shows an illustrative example of a networking environment 300 in which a MACsec session is established between a set of nodes 302, 306 verifiably connected to one another within a network enclave in accordance with various implementations. In the networking environment 300, a source node 302 and a destination node 306 within a network enclave are neighbors sharing a common link. These neighbors may form an adjacency to exchange routing protocol packets, data packets, and the like.

In various instances, there may be intermediate devices 304 connecting these neighbors (e.g., source node 302 and destination node 306). For example, rather than a physical cable separating the source node 302 and the destination node 306 within the network enclave, one or more intermediate devices 304 may provide connectivity between these neighbors. To prevent security threats, such as passive wiretapping, intrusion, man-in-the-middle (MitM) attacks, playback attacks, and the like, the source node 302 and the destination node 306 may establish a MACsec session. This MACsec session may prevent any of these intermediate devices 304 from snooping or altering the network traffic between the source node 302 and the destination node 306. Network traffic transmitted over a MACsec session is encrypted and decrypted using a cipher suite agreed upon by the source node 302 and the destination node 306.

References to a MACsec session established between the source node 302 and the destination node 306 may be incorporated into the validation tokens of each of the source node 302 and the destination node 306 to allow the enclave manager of the network enclave to verify that these nodes are verifiably connected to one another. Further, this may serve as proof that additional elements not known to be part of the network enclave are not secretly or accidentally included within the network enclave.

Figure 4:
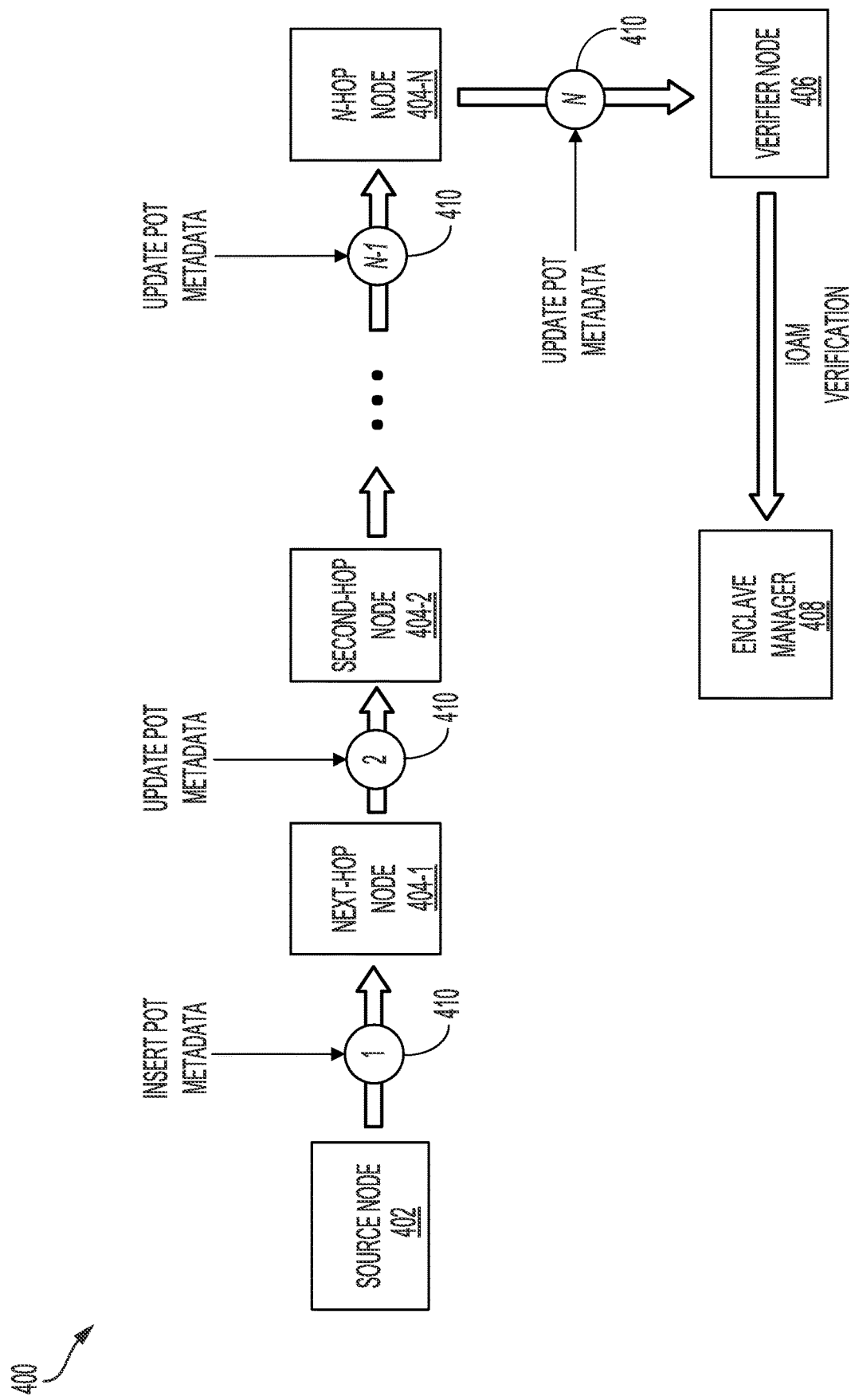
FIG. 4 shows an illustrative example of a networking environment in which in-situ Operations, Administration, and Maintenance (iOAM) path tracing is utilized to verify that a data packet traversed a valid network path within a network enclave in accordance with some implementations.

FIG. 4 shows an illustrative example of a networking environment 400 in which iOAM path tracing is utilized to verify that a data packet 410 traversed a valid network path within a network enclave in accordance with some implementations. In the networking environment 400, an enclave manager 408 may configure a set of nodes within the network enclave to provide proof of transit metadata via an iOAM data field of the data packets traversing the network enclave. When a source node 402 routes a data packet 410 to a next-hop node 404-1 within the network enclave, the source node 402 inserts proof of transit metadata into the iOAM data field of the data packet 410. The next-hop node 404-1 may subsequently update the metadata to insert its own proof of transit data into the iOAM data field and transmit the updated data packet 410 to a second-hop node 404-2. This process may continue until the updated data packet 410 reaches an egress node (e.g., N-hop node 404-N, as illustrated in FIG. 4).

The egress node 404-N may also update the metadata to insert its own proof of transit data into the iOAM data field of the data packet 410. Once the data packet 410 has been updated, the egress node 404-N may transmit the updated data packet 410 to a verifier node 406, which may determine the network status of the network enclave based on the proof of transit data included within the iOAM data field of the data packet 410. For instance, the verifier node 406 may determine whether the proof of transit data corresponding to valid network paths through the network enclave. If the proof of transit data corresponds to a valid network path, the verifier node 406 may transmit a notification to the enclave manager 408 to indicate that data packets are traversing the network enclave along valid network paths. Alternatively, if the proof of transit data does not correspond to a valid network path, the verifier node 406 may alert the enclave manager 408 as to a potential issue with the network of the network enclave.

Figure 5:
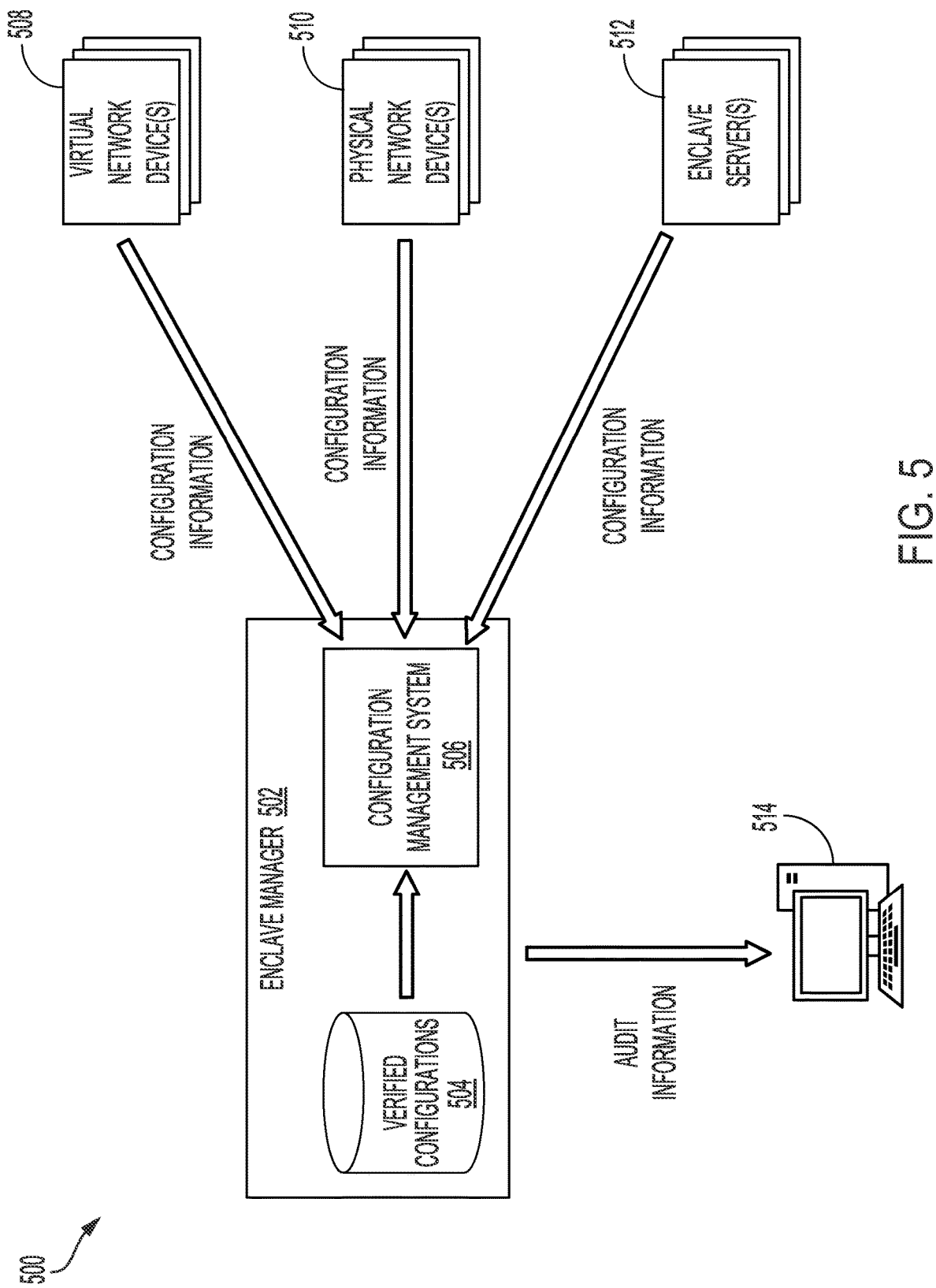
FIG. 5 shows an illustrative example of a networking environment in which a configuration management system compares the configuration information for components of a network enclave to verified configurations of these components to perform an audit of these components in accordance with some implementations.

FIG. 5 shows an illustrative example of a networking environment 500 in which a configuration management system 506 compares the configuration information for components of a network enclave to verified configurations of these components to perform an audit of these components in accordance with some implementations. As noted above, the enclave manager 502 may obtain configuration information for each component of the network enclave. These components may include virtual network devices 508, physical network devices 510, enclave servers 512, and any other components that may be classified as being within the network enclave.

A configuration management system 506 of the enclave manager 502 may obtain the configuration information for each of the components of the network enclave. For instance, the configuration management system 506 may query each of these components to obtain the necessary configuration information for performance of an audit on the configurations of these components. Alternatively, the various components of the network enclave may report the configuration information themselves over time. It should be noted that while the configuration management system 506 is illustrated as being implemented as part of the enclave manager 502, the configuration management system 506 may be implemented as a stand-alone system separate from the enclave manager 502.

In an embodiment, the enclave manager 502 maintains, within a verified configurations repository 504, known valid configuration information for each device type within the network enclave. The configuration management system 506 may obtain the known valid configuration information from the repository 504 and compare these to the configuration information obtained from the various components of the network enclaves. Based on this comparison, the configuration management system 506 may identify any configuration drift between the known valid configuration information for a component and the observed configuration information provided by the component. A summary of these comparisons may be provided in the form of audit information that may be provided to the operator/peer 514 of the network enclave.

Figure 6:
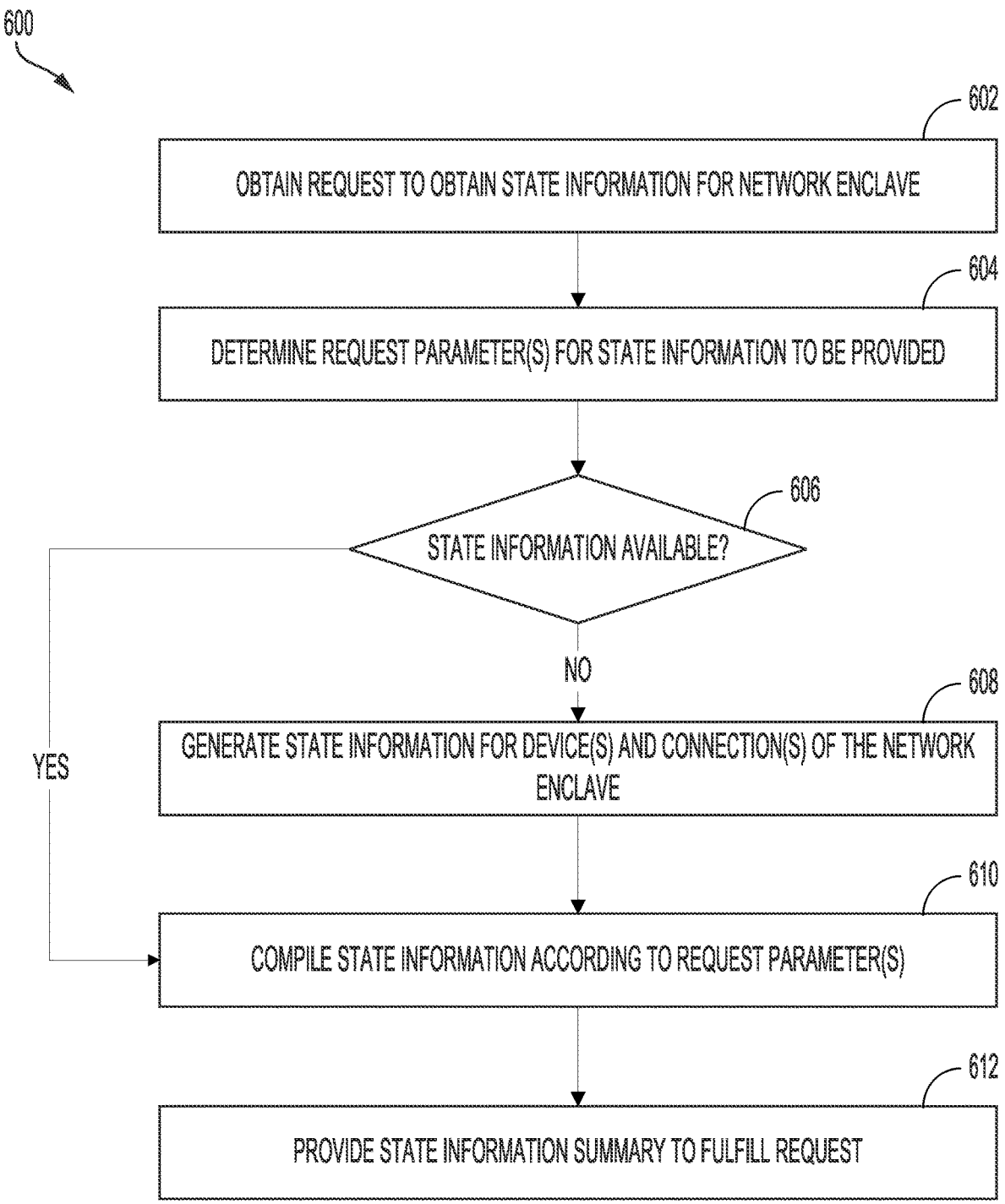
FIG. 6 shows an illustrative example of a process for generating and providing a summary of state information for a network enclave in accordance with some implementations.

FIG. 6 shows an illustrative example of a process 600 for generating and providing a summary of state information for a network enclave in accordance with some implementations. The process 600 may be performed by the enclave manager of the network enclave, which may compile information that may be used to verifiably advertise that the network state is trustworthy or is otherwise in an acceptable state. This advertisement may be presented in the form of a summary of the various operations performed by the enclave manager (e.g., KPI monitoring of the compute and network devices, configuration audits, evaluation of validation tokens for the network enclave devices, PSIRT information evaluations, etc.) and the results generated as a result of these operations.

In an embodiment, the enclave manager obtains 602 a request to obtain state information for the network enclave. The request may be provided in the form of an inter-domain API submitted by an administrator or other operator of the network enclave. The inter-domain API may alternatively be submitted by any of the nodes (e.g., devices) of the network enclave seeking to validate any other nodes of the network enclave. The inter-domain API may specify what information is required by the requestor (e.g., operator, administrator, node, etc.) to determine the trustworthiness of the network enclave. For instance, the inter-domain API may indicate that an audit of the configuration of each enclave device is to be performed to identify any configuration drift among the enclave devices. Additionally, or alternatively, the inter-domain API may indicate that a summary of the integrity verification state of all compute and network devices, as well as boot-to-application level attestation (e.g., validation tokens, etc.) demonstrating that the enclave manager is trustworthy is to be provided. The inter-domain API may further indicate that evidence indicating that the devices of the network enclave are executing specific software versions according to respective device types is to be provided. Other examples of information that may be requested include, but are not limited to, PSIRT information relevant to the various devices of the network enclave, initiation of iOAM path tracing through the network enclave to ensure that data packets are transmitted within the network enclave using network paths transiting devices which are verified to meet a set of security metrics or avoid other devices with known unaddressed PSIRT information, results of a configuration audit of all enclave devices as reported by the enclave devices over time, results generated in response to KPI monitoring of the enclave devices to identify anomalies, and the like.

In response to the request, the enclave manager may determine 604 the request parameters for the state information to be provided. For instance, the enclave manager may determine, from the inter-domain API, the different operations to be performed to generate the validation data necessary to verifiably advertise the state of the network enclave. This may include a determination of the information to be included in the summary specifying the state of the network enclave that is to be provided for fulfillment of the request.

Based on these request parameters, the enclave manager may determine 606 whether the state information required to generate the summary specifying the state of the network enclave for various metrics is available. For instance, the enclave manager may perform, periodically or in response to a triggering event (e.g., detection of a possible device vulnerability, unusual behavior among one or more enclave devices, etc.), any of the operations described above in order to obtain the state information of the various enclave devices. The enclave manager may retain this state information for a period of time or until a new set of operations are performed to determine updated state information for the enclave devices. Alternatively, the enclave manager may perform these operations in response to the inter-domain API. It should be noted that subsets of operations may be performed periodically or in response to a triggering event, while other subsets of operations may be performed in response to the inter-domain API.

If the required state information is not available, the enclave manager may generate 608 state information for the enclave devices and network connections among these enclave devices. For instance, based on the request parameters and the available state information, the enclave manager may determine what operations are to be performed to generate any missing state information that may be used to generate the summary specifying the overall state of the network enclave. The enclave manager may perform these operations to generate the necessary state information for the enclave devices and the various network connections among these devices of the network enclave.

If the required state information is available or has otherwise been generated by the enclave manager in response to the inter-domain API, the enclave manager may compile 610 this state information according to the request parameters in order to generate a summary that may be used to verifiably determine the state of the network enclave. For instance, using the state information for the various enclave devices and network connections among these devices, the enclave manager may generate a table or other data structure summarizing the integrity verification state of all enclave devices, as well as the boot-to-application level attestation of the enclave manager, which may be used to demonstrate the trustworthiness of the enclave manager. Additionally, or alternatively, the enclave manager may indicate, in the summary, whether the network enclave is executing specific software versions installed on particular device types, any PSIRT information or proof that enclave devices are free of any vulnerabilities identified in the PSIRT information, results of an iOAM path tracing evaluation, results of an audit of the configurations of the various enclave devices, and the results of any compliance tests performed using KPI monitoring of the enclave devices. Once this summary has been generated, the enclave manager may provide 612 this summary to the requestor to fulfill the request.

Figure 7:
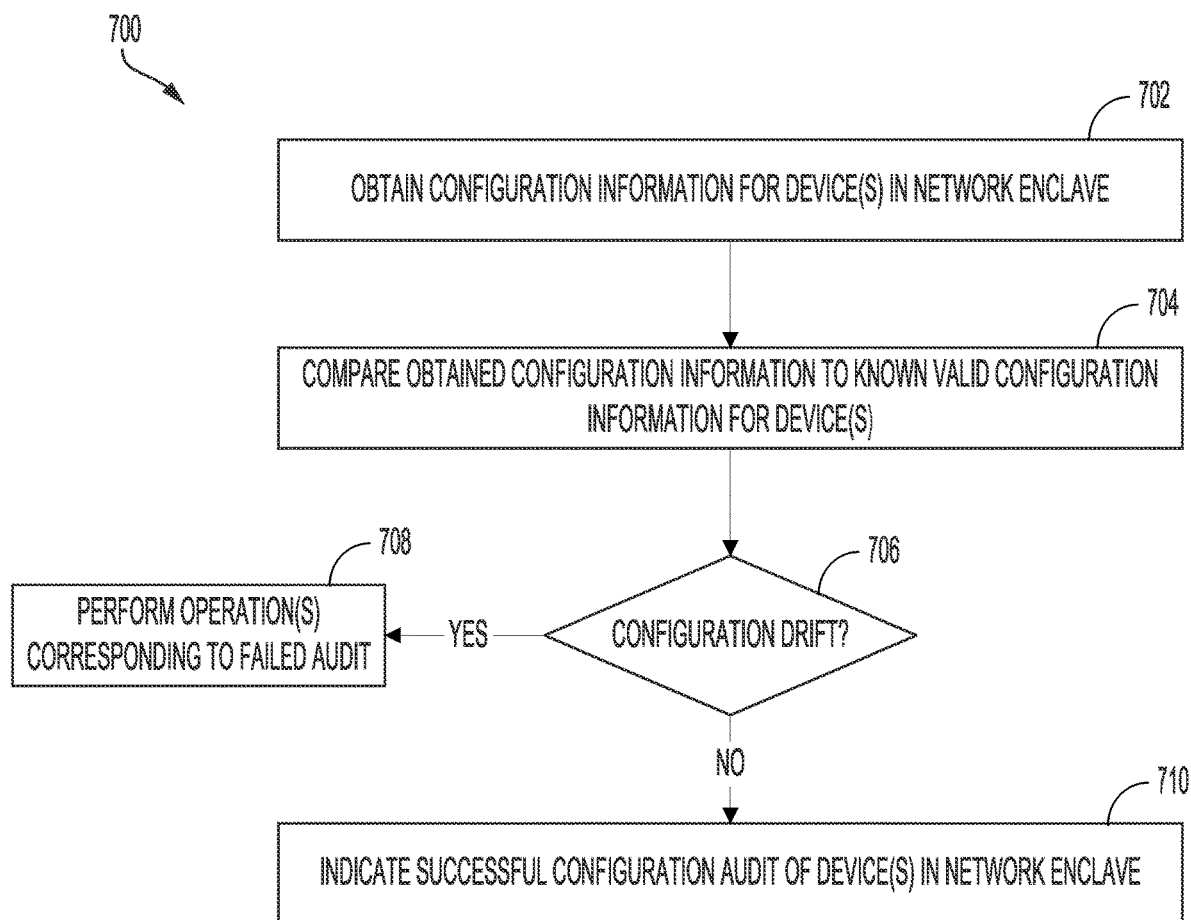
FIG. 7 shows an illustrative example of a process for performing an audit of a set of components of a network enclave to determine any drifts in the configurations of these components in accordance with some implementations.

FIG. 7 shows an illustrative example of a process 700 for performing an audit of a set of components of a network enclave to determine any drifts in the configurations of these components in accordance with some implementations. The process 700 may be performed by the enclave manager, which may perform an audit of the various compute and network devices of the network enclave to identify the configured state of these devices as reported by these devices over time. In an embodiment, the enclave manager obtains 702, from each compute device and network device, configuration information for these devices operating within the network enclave. The enclave manager may obtain this configuration information by transmitting a request to each compute and network device of the network enclave to provide this configuration information. Alternatively, each of the compute devices and network devices may push their configuration information to the enclave manager over time (e.g., periodically, as defined by an administrator or other operator of the network enclave, etc.).

In response to obtaining the configuration information for each of the compute devices and network devices of the network enclave, the enclave manager may compare 704 the obtained configuration information to known valid configuration information for these devices. For instance, the enclave manager may access a management platform for the network enclave, which may maintain the known valid configuration information for each of the compute devices and network devices of the network enclave. Using the obtained configuration information from the various devices of the network enclave and the known valid configuration information for these devices, the enclave manager may identify any differences in the configuration of any of the devices of the network enclave.

Based on this comparison, the enclave manager may determine 706 whether there is a configuration drift for one or more of the compute devices and network devices of the network enclave. In some embodiments, to determine that a configuration drift is present, the difference in the configuration information for a particular device of the network device is to exceed a maximum threshold. If the difference exceeds this maximum threshold, the enclave manager may determine that there is a configuration drift in the configuration of the particular device. If the enclave manager determines that there is a configuration drift in the configuration of a particular device, the enclave manager may perform 708 one or more operations corresponding to a failed audit. For instance, the enclave manager may notify an administrator or other operator of the network enclave to indicate that one or more compute and/or network devices have failed the configuration audit. This may cause the administrator or other operator to perform remedial actions on these devices (e.g., update the configuration of these devices, provision replacement devices, route network traffic to other devices in the network enclave, etc.). The enclave manager may, alternatively, perform these remedial actions on behalf of an administrator or other operator of the network enclave without need to indicate failure of the audit.

If the enclave manager determines that there is no configuration drift for the compute and network devices of the network enclave, the enclave manager may indicate 710 successful configuration audit of these devices in the network enclave. For instance, in response to a request from an administrator or other operator of the network enclave to determine the trustworthiness of the various compute and network devices of the network enclave, the enclave manager may provide a summary that includes an indication of the successful configuration audit. Alternatively, the enclave manager may push a notification to operators and other users of the network enclave subscribed to receive notifications from the enclave manager to indicate successful completion of the configuration audit of the various devices of the network enclave.

Figure 8:
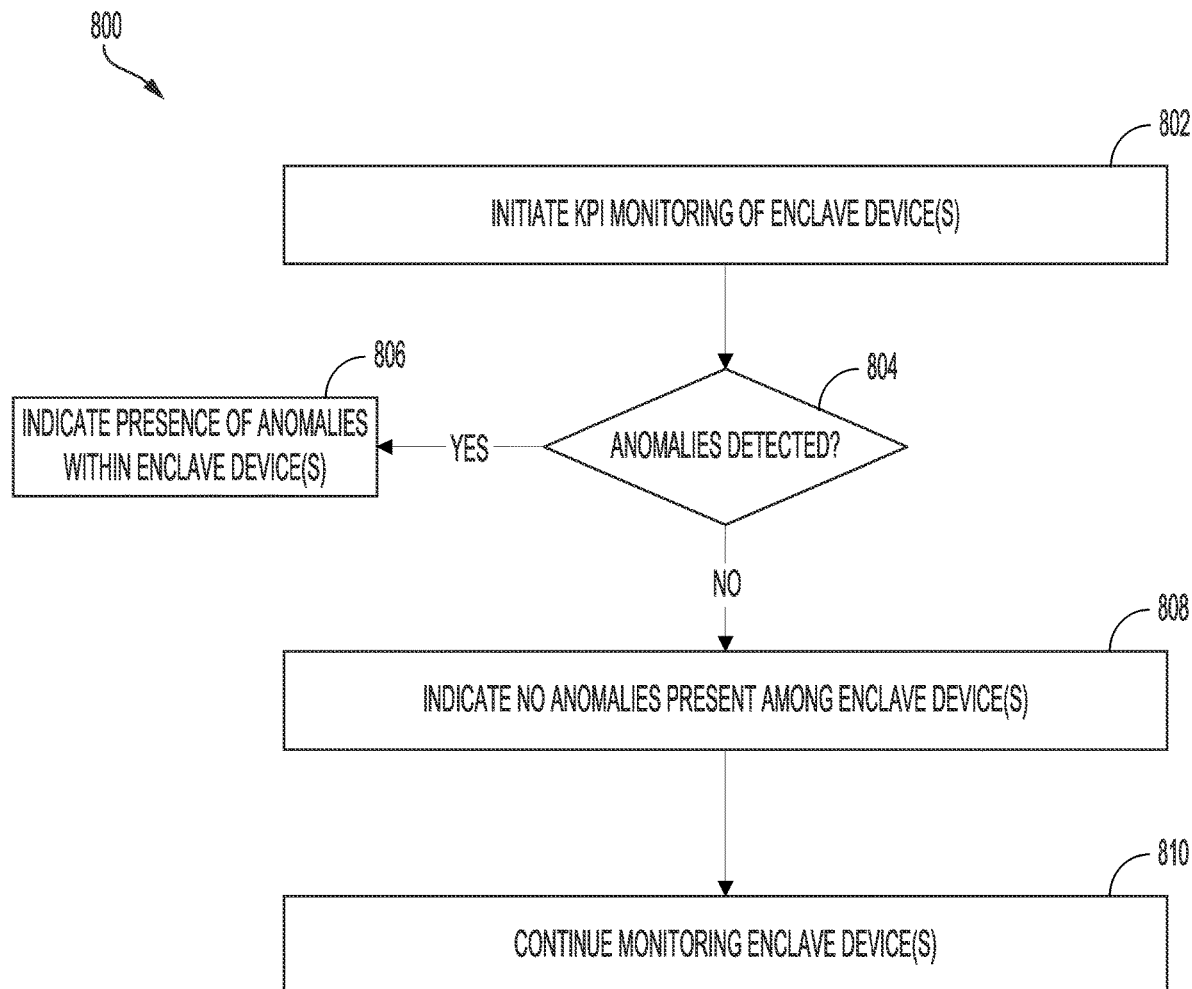
FIG. 8 shows an illustrative example of a process for monitoring of key performance indicators (KPIs) of a set of components of a network enclave to identify any anomalies in the operation of this set of components in accordance with some implementations.

FIG. 8 shows an illustrative example of a process 800 for monitoring KPIs of a set of components of a network enclave to identify any anomalies in the operation of this set of components in accordance with some implementations. The process 800 may be performed by the enclave manager of the network enclave, which may perform KPI monitoring of the various compute devices and network devices of the network enclave to determine whether these devices are in compliance with acceptable load or behavior requirements. In an embodiment, the enclave manager initiates 802 KPI monitoring of one or more enclave devices (e.g., compute devices, network devices, etc.) of the network enclave. The enclave manager may initiate KPI monitoring in response to a request from an operator of the network enclave or other entity that may seek to determine the runtime security posture of the network enclave. Alternatively, the enclave manager may initiate KPI monitoring of these one or more enclave devices in response to a triggering event, such as detection of anomalous behavior within the network enclave, obtaining a notification of a security event involving the network enclave, and the like.

As the enclave manager evaluates the KPIs for the various enclave devices of the network enclave, the enclave manager may determine 804 whether any anomalies have been detected. For instance, based on the KPIs for an enclave device, the network enclave may identify suspicious behaviors even though the validation token for the enclave device demonstrates that the enclave device is otherwise trustworthy. These suspicious behaviors may include unusual power draws, increased latency, significant variations in network traffic, significant variations in load, and the like. If the enclave manager detects one or more anomalies during operation of an enclave device, the enclave manager may indicate 806 the presence of such anomalies within the enclave device. For instance, the enclave manager may transmit a notification to an operator of the network enclave to indicate that one or more anomalies have been detected. This may cause the operator to perform mitigation actions (e.g., removing the affected device from service, re-routing network traffic to reduce network traffic through the affected device, apply security measures on the affected device, initiate path tracing through the affected device, etc.) to address these anomalies.

If the enclave manager fails to detect any anomalies with regard to the operation of the one or more enclave devices, the enclave manager may indicate that no anomalies are present among these enclave devices. For instance, if the KPI monitoring of these enclave devices is performed in response to a request from an operator, the enclave manager may provide, in its response to the request, this indication that no anomalies are present among these enclave devices. Alternatively, if the KPI monitoring of these enclave devices is performed independently from any operator request to determine the trustworthiness of the network enclave, the enclave manager may store data generated as a result of the KPI monitoring of these enclave devices such that the data is readily available in response to operator requests for information that may be used to validate the trustworthiness of the network enclave. The enclave manager may continue 810 KPI monitoring of the enclave devices over time to identify any anomalies as they occur, thus continuing execution of the process 800.

Figure 9:
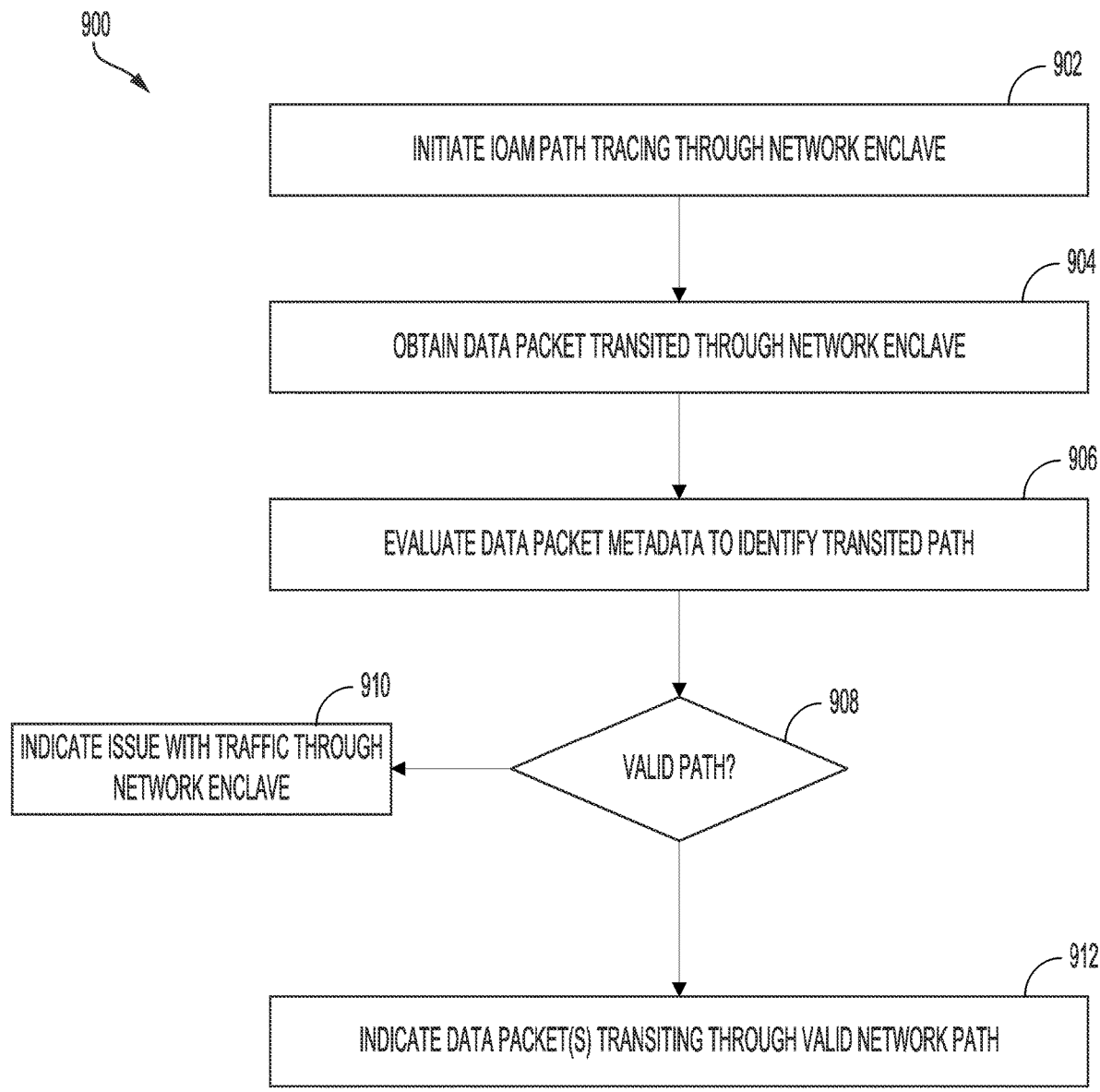
FIG. 9 shows an illustrative example of a process for using iOAM path tracing through a network enclave to determine whether a data packet has traversed a valid path within the network enclave in accordance with some implementations.

FIG. 9 shows an illustrative example of a process 900 for using iOAM path tracing through a network enclave to determine whether a data packet has traversed a valid path within the network enclave in accordance with some implementations. The process 900 may be performed by the enclave manager of a network enclave, which may process incoming requests from an operator of the network enclave or from any node within the network enclave to verify that data packets transiting through the network enclave follow valid network paths within the network enclave.

In an embodiment, the enclave manager initiates 902 iOAM path tracing through the various components of the network enclave. For instance, the enclave manager may deploy iOAM on network traffic traversing through the network enclave or through specific devices and other components of the network enclave. Additional metadata may be added to data packets corresponding to this network traffic, where the data packets may traverse the network enclave. This additional metadata may be carried as part of an iOAM data field in a variety of encapsulation protocols.

When a data packet traverses the network enclave and reaches a particular endpoint, the enclave manager may obtain 904 this data packet and evaluate 906 the metadata encapsulated in the iOAM data field to identify the transited path through the network enclave. For instance, using the metadata encapsulated in the iOAM data field, the enclave manager may identify the forwarding topology through the network enclave, including the devices traversed through the network enclave. Using the metadata, the enclave manager may determine 908 whether the transited path for the data packet is a valid path.

If the transited path does not correspond to a valid path (e.g., not all devices transited are trustworthy), the enclave manager may indicate 910 an issue with network traffic transiting through the network enclave. For instance, the enclave manager may transmit a notification to an administrator or other responsible party for the network enclave to cause the administrator or other responsible party to perform mitigating actions to address this issue. The enclave manager may also attempt to redirect network traffic to other devices within the network enclave to drive network traffic towards valid paths. However, if the transited path does correspond to a valid path through the network enclave, the enclave manager may indicate that these data packets are transiting through a valid network path.

FIG. 10 illustrates an example network device 1000 suitable for performing switching, routing, and other networking operations in accordance with some implementations. Network device 1000 includes a CPU 1004, interfaces 1002, and a connection 1010 (e.g., a Peripheral Component Interconnect (PCI) bus). When acting under the control of appropriate software or firmware, the CPU 1004 is responsible for executing packet management, error detection, and/or routing functions. The CPU 1004 can accomplish these functions under the control of software including an operating system and any appropriate applications software. The CPU 1004 may include one or more processors 1008, such as a processor from the Intel® X98 family of microprocessors. In some cases, the processor 1008 can be specially designed hardware for controlling the operations of network device 1000. In some cases, a memory 1006 (e.g., non-volatile RAM, ROM, etc.) also forms part of the CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 1004 to efficiently perform routing computations, network diagnostics, security functions, etc.

Although the system shown in FIG. 10 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 1000.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1006 could also hold various software containers and virtualized execution environments and data.

The network device 1000 can also include an application-specific integrated circuit (ASIC) 1012, which can be configured to perform routing and/or switching operations. The ASIC 1012 can communicate with other components in the network device 1000 via the connection 1010, to exchange data and signals and coordinate various types of operations by the network device 1000, such as routing, switching, and/or data storage operations, for example.

FIG. 11 illustrates a computing system architecture 1100 including various components in electrical communication with each other using a connection 1106, such as a bus, in accordance with some implementations. Example system architecture 1100 includes a processing unit (CPU or processor) 1104 and a system connection 1106 that couples various system components including the system memory 1120, such as ROM 1118 and RAM 1116, to the processor 1104. The system architecture 1100 can include a cache 1102 of high-speed memory connected directly with, in close proximity to, or integrated as part of the processor 1104. The system architecture 1100 can copy data from the memory 1120 and/or the storage device 1108 to the cache 1102 for quick access by the processor 1104. In this way, the cache can provide a performance boost that avoids processor 1104 delays while waiting for data. These and other modules can control or be configured to control the processor 1104 to perform various actions.

Other system memory 1120 may be available for use as well. The memory 1120 can include multiple different types of memory with different performance characteristics. The processor 1104 can include any general purpose processor and a hardware or software service, such as service 1 1110, service 2 1112, and service 3 1114 stored in storage device 1108, configured to control the processor 1104 as well as a special-purpose processor where software instructions are incorporated into the actual processor design. The processor 1104 may be a completely self-contained computing system, containing multiple cores or processors, a bus, memory controller, cache, etc. A multi-core processor may be symmetric or asymmetric.

To enable user interaction with the computing system architecture 1100, an input device 1122 can represent any number of input mechanisms, such as a microphone for speech, a touch-sensitive screen for gesture or graphical input, keyboard, mouse, motion input, speech and so forth. An output device 1124 can also be one or more of a number of output mechanisms known to those of skill in the art. In some instances, multimodal systems can enable a user to provide multiple types of input to communicate with the computing system architecture 1100. The communications interface 1126 can generally govern and manage the user input and system output. There is no restriction on operating on any particular hardware arrangement and therefore the basic features here may easily be substituted for improved hardware or firmware arrangements as they are developed.

Storage device 1108 is a non-volatile memory and can be a hard disk or other types of computer readable media which can store data that are accessible by a computer, such as magnetic cassettes, flash memory cards, solid state memory devices, digital versatile disks, cartridges, RAMs 1116, ROM 1118, and hybrids thereof.

The storage device 1108 can include services 1110, 1112, 1114 for controlling the processor 1104. Other hardware or software modules are contemplated. The storage device 1108 can be connected to the system connection 1106. In one aspect, a hardware module that performs a particular function can include the software component stored in a computer-readable medium in connection with the necessary hardware components, such as the processor 1104, connection 1106, output device 1124, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
obtaining a request to retrieve transit path information corresponding to compute devices and network devices comprising a network enclave, the transit path information comprising proof of packet paths through nodes within the network enclave;
evaluating the compute devices, the network devices, and network connections among the compute devices and the network devices within the network enclave to obtain the transit path information;
determining, based on the transit path information verifying the packet paths, that the compute devices and the network devices comprising the network enclave are trustworthy;
generating, based on the determination that the compute devices and the network devices comprising the network enclave are trustworthy, a response to the request; and
providing the response to fulfill the request.

2. The computer-implemented method of claim 1, the method further comprising:
initiating in-situ Operations, Administration, and Maintenance (iOAM) path tracing through the nodes within the network enclave;
obtaining a data packet and evaluating metadata encapsulated in an iOAM data field to identify a transited path through the network enclave; and
identifying that the transited path no longer corresponds to a valid packet path.

3. The computer-implemented method of claim 2, wherein based on identifying that the transited path does not correspond to a valid packet path, transmitting a notification to perform a mitigating action to drive network traffic to another packet path.

4. The computer-implemented method of claim 1, wherein the response further comprises information corresponding to an integrity verification state of the compute devices and of the network devices.

5. The computer-implemented method of claim 1, wherein determining whether the network enclave is trustworthy comprises evaluating integrity data of the compute devices and of Platform Configuration Registers (PCRs) of the network devices for the network enclave.

6. The computer-implemented method of claim 1, wherein the response further comprises Product Security Incident Response Team (PSIRT) information that details security vulnerabilities for the compute devices and the network devices of the network enclave.

7. The computer-implemented method of claim 6, further comprising:
determining, based on the PSIRT information and the configuration information of the compute devices and of the network devices, whether any of the compute devices and the network devices comprise a vulnerable feature; and
in response to determining that at least one of the compute devices or the network devices comprise the vulnerable feature, providing, in the response notification of the vulnerable feature.

8. A system comprising:
a processor for executing instructions stored in memory, wherein execution of the instructions by the processor executes:
obtaining a request to retrieve transit path information corresponding to compute devices and network devices comprising a network enclave, the transit path information comprising proof of packet paths through nodes within the network enclave;
evaluating the compute devices, the network devices, and network connections among the compute devices and the network devices within the network enclave to obtain the transit path information;
determining, based on the transit path information verifying the packet paths, that the compute devices and the network devices comprising the network enclave are trustworthy;
generating, based on the determination that the compute devices and the network devices comprising the network enclave are trustworthy, a response to the request; and
providing the response to fulfill the request.

9. The system of claim 8, wherein execution of the instructions by the processor further executes:
initiating in-situ Operations, Administration, and Maintenance (iOAM) path tracing through the nodes within the network enclave;
obtaining a data packet and evaluating metadata encapsulated in an iOAM data field to identify a transited path through the network enclave; and
identifying that the transited path no longer corresponds to a valid packet path.

10. The system of claim 9, wherein based on identifying that the transited path does not correspond to a valid packet path, transmitting a notification to perform a mitigating action to drive network traffic to another packet path.

11. The system of claim 8, wherein the response further comprises information corresponding to an integrity verification state of the compute devices and of the network devices.

12. The system of claim 8, wherein determining whether the network enclave is trustworthy comprises evaluating integrity data of the compute devices and of Platform Configuration Registers (PCRs) of the network devices for the network enclave.

13. The system of claim 8, wherein the response further comprises Product Security Incident Response Team (PSIRT) information that details security vulnerabilities for the compute devices and the network devices of the network enclave.

14. The system of claim 8, wherein execution of the instructions by the processor further executes:
determining, based on the PSIRT information and the configuration information of the compute devices and of the network devices, whether any of the compute devices and the network devices comprise a vulnerable feature; and
in response to determining that at least one of the compute devices or the network devices comprise the vulnerable feature, providing, in the response notification of the vulnerable feature.

15. A non-transitory computer readable medium comprising instructions, the instructions, when executed by a computing system, cause the computing system to:
obtain a request to retrieve transit path information corresponding to compute devices and network devices comprising a network enclave, the transit path information comprising proof of packet paths through nodes within the network enclave;
evaluate the compute devices, the network devices, and network connections among the compute devices and the network devices within the network enclave to obtain the transit path information;

determine, based on the transit path information verifying the packet paths, that the compute devices and the network devices comprising the network enclave are trustworthy;

generate, based on the determination that the compute devices and the network devices comprising the network enclave are trustworthy, a response to the request; and provide the response to fulfill the request.

16. The non-transitory computer readable medium of claim 15, the instructions further causing the computing system to:

initiate in-situ Operations, Administration, and Maintenance (iOAM) path tracing through the nodes within the network enclave;

obtain a data packet and evaluating metadata encapsulated in an iOAM data field to identify a transited path through the network enclave; and identify that the transited path no longer corresponds to a valid packet path.

17. The non-transitory computer readable medium of claim 16, wherein based on identifying that the transited path does not correspond to a valid packet path, transmitting a notification to perform a mitigating action to drive network traffic to another packet path.

18. The non-transitory computer readable medium of claim 15, wherein the response further comprises information corresponding to an integrity verification state of the compute devices and of the network devices.

19. The non-transitory computer readable medium of claim 15, wherein determining whether the network enclave is trustworthy comprises evaluating integrity data of the compute devices and of Platform Configuration Registers (PCRs) of the network devices for the network enclave.

20. The non-transitory computer readable medium of claim 15, wherein the response further comprises Product Security Incident Response Team (PSIRT) information that details security vulnerabilities for the compute devices and the network devices of the network enclave.

* * * * *